United States Patent [19]

Henry et al.

[11] Patent Number: 4,518,655

[45] Date of Patent: May 21, 1985

[54] FUSING MEMBER FOR ELECTROSTATOGRAPHIC COPIERS

[75] Inventors: Arnold W. Henry, Pittsford; Jack C. Azar; John Sagal, both of Rochester, all of N.Y.

[73] Assignee: Xerox Corporation, Stamford, Conn.

[21] Appl. No.: 555,103

[22] Filed: Nov. 25, 1983

[51] Int. Cl.[3] .......................... B21B 31/08; B32B 5/16

[52] U.S. Cl. ...................................... 428/329; 29/132; 118/60; 428/334; 428/335; 428/447; 428/450; 428/332; 430/99; 432/60

[58] Field of Search ............... 428/450, 447, 328, 329, 428/334, 335, 332; 118/60; 29/132; 432/60

[56] References Cited

U.S. PATENT DOCUMENTS

| | | | |
|---|---|---|---|
| 2,710,289 | 7/1955 | Smith-Johannsen | 260/37 |
| 2,934,464 | 4/1960 | Hoffman et al. | 154/43 |
| 2,999,077 | 9/1961 | Nitzsche et al. | 260/18 |
| 3,231,527 | 1/1966 | Frederic | 260/18 |
| 3,240,731 | 3/1966 | Nitzsche et al. | 260/18 |
| 3,269,981 | 8/1966 | Goossens | 260/46.5 |
| 3,294,732 | 12/1966 | Nitzsche et al. | 260/37 |
| 3,296,161 | 1/1967 | Kulpa | 260/18 |
| 3,328,481 | 6/1967 | Vincent | 260/825 |
| 3,451,964 | 6/1969 | Creamer | 260/37 |
| 3,535,357 | 10/1970 | Creamer | 260/448.2 |
| 3,586,699 | 6/1971 | Wu | 260/326.5 |
| 3,631,220 | 12/1971 | Wojdac | 260/825 |
| 3,696,127 | 10/1972 | Matherly | 260/375 B |
| 3,795,033 | 3/1974 | Donnelly et al. | 29/132 |
| 3,809,854 | 5/1974 | Sanders | 219/216 |
| 3,848,305 | 11/1974 | Jachimiak | 29/132 |
| 3,849,462 | 11/1974 | Lengnick | 260/448.2 D |
| 3,879,319 | 4/1975 | Sato et al. | 260/18 S |
| 3,902,845 | 9/1975 | Murphy | 432/60 |
| 3,941,741 | 3/1976 | De Zuba et al. | 260/37 SB |
| 4,064,313 | 12/1977 | Takiguchi et al. | 428/447 |
| 4,074,001 | 2/1978 | Imai et al. | 428/329 |
| 4,075,390 | 2/1978 | Murphy | 428/307 |
| 4,078,286 | 3/1978 | Takiguichi et al. | 29/132 |
| 4,101,499 | 7/1978 | Herzig | 260/37 SB |
| 4,145,504 | 3/1979 | Hedaya et al. | 528/5 |
| 4,149,797 | 4/1979 | Imperial | 355/3 FU |
| 4,360,566 | 11/1982 | Shimizu | 428/447 |
| 4,373,239 | 2/1983 | Henry et al. | 29/132 |

FOREIGN PATENT DOCUMENTS

| | | | |
|---|---|---|---|
| 658954 | 3/1963 | Canada | 401/4 |

*Primary Examiner*—Ellis P. Robinson

[57] ABSTRACT

A fuser member for electrostatographic reproducing apparatus is provided which has a rigid core having coated thereon a thin layer of a composition which comprises the crosslinked product of a mixture of about 100 parts by weight alpha omega-hydroxypolydimethylsiloxane, about 190 to 250 parts by weight total alumina, comprising from about 60 to about 90 percent by weight of finely divided tabular alumina and from about 10 to about 40 percent by weight calcined alumina, together with effective amounts of a crosslinking agent and a crosslinking catalyst.

8 Claims, 3 Drawing Figures

FUSING MEMBER FOR ELECTROSTATOGRAPHIC COPIERS

This invention relates to a novel fusing or fixing member for electrostatographic copiers.

BACKGROUND OF THE INVENTION

As indicated in U.S. Pat. No. 4,078,286, in a typical process for electrophotographic duplication, a light image of an original to be copied is recorded in the form of an electrostatic latent image upon a photosensitive member, and the latent image is subsequently rendered visible by the application of electroscopic particles, which are commonly referred to as toner. The visible toner image is then in a loose powdered form and it can be easily disturbed or destroyed. The toner image is usually fixed or fused upon a support which may be the photosensitive member itself or another support such as a sheet of plain paper. The present invention relates to the fusing of the toner image upon a support.

In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

The use of thermal energy for fixing toner images onto a support member is well known. Several approaches to thermal fusing of electroscopic toner images have been described in the prior art. These methods include providing the application of heat and pressure substantially concurrently by various means: a roll pair maintained in pressure contact; a flat or curved plate member in pressure contact with a roll; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the materials being copied there. The so called "hot offset" occurs when the temperature of the toner is raised to a point where the toner particles liquify and a splitting of the molten toner takes place during the fusing operation. "Cold offset" may be caused, even at the temperatures below the molten point of the toner, by such factors as imperfections in the surface of the fusing members; by the toner particles being insufficiently adhering to the support; by electrostatic forces which may be present; etc.

Another problem frequently encounteres in fusing with a heated member is that the substrate, e.g. a sheet of paper, on which the toner image is fused may curl and/or adhere to the heated fuser. Such adhering paper will tend to wrap itself around the fuser and thus prevent the fuser from performing its intended operations in subsequent copying cycles. Such adhering paper must be generally removed by hand, resulting in much manual labor and machine downtime.

PRIOR ART

As indicated in said U.S. Pat. No. 4,078,286, it is known in the prior art to provide the heated member in a fusing system with a covering of a heat-resistant, release material on its outer surface. Coupled to such a heated member is a backup or pressure member covered with a heat-resistant, flexible material. The nip is formed by the flexible material under pressure contact with the heated member. Examples of the heat resistant release materials for the fuser members include polytetrafluoroethylene, silicone rubber, fluorocarbon elastomers and the like. A suitable offset preventing liquid may be used on the fuser member to minimize or avoid "offsetting". Silicone oils are widely used as the offset preventing or release agent. The pressure member may be made of such materials as silicone rubber and polyfluoroethylenepropylene.

In U.S. Pat. No. 4,074,001, there is disclosed a fixing roll for electrophotography having a surface layer made of a diorganopolysiloxane having silanol groups at the molecular terminals, a diorganopolysiloxane having trialkylsilyl groups at the molecular terminals, an alkoxy-containing silane, a metal salt of an organic acid as the crosslinking catalyst, a powdery calcium carbonate, iron oxide, and titanium dioxide.

In a more recent development U.S. Pat. No. 4,373,239 describes a fuser with a thermally conductive and resiliently compressable material having high thermomechanical strength and good release properties which is made from a composition comprising 100 parts by weight of alpha omega-hydroxypolydimethylsiloxane having a number average molecular weight of about 5,000 to 20,000, about 128 to 250 parts by weight of finely divided tabular alumina, about 13 to 60 parts by weight of finely divided iron oxide, about 6 to 9 parts by weight of a crosslinking agent, and about 0.25 to 1.8 parts by weight of a crosslinking catalyst. The composition may be cured and coated onto a fuser member at a thickness about 10 to 100 mils.

While the prior art fusers have been effective in providing improvements in fusing capability, there is a continuing need to improve the balance between thermal conductivity, thermomechanical properties, good release properties, and the useful life of the fuser. In the fuser member described in U.S. Pat. No. 4,373,239 it has been found that the finely divided iron oxide has a comparatively low thermal conductivity. This requires therefore that the fuser member be heated to a higher temperature internally to maintain the optimum fusing or surface temperature, thereby bringing an accelerated degradation of the siloxane. In other words, with the same surface temperature to be achieved with this material containing a material low in thermal conductivity, a higher internal core temperature for a fuser roll will have to be maintained which causes an increase in the thermal degradation of the polydimethylsiloxane. Furthermoe, in addition to the thermal degradation achieved, additional energy is required to arrive at and maintain the increased internal core temperature. Accordingly, it is desirable to have an alternative composition for use as the fuser member. In the aforementioned U.S. Pat. No. 4,373,239 at column 5, lines 53 to 55, in discussing the importance of the use of tabular alumina in the invention therein described it has been indicated that calcined alumina "is unsuitable per se" This is because calcined alumina has a fairly high surface activity which leads to release problems during the fusing operation particularly when the calcined alumina is used in any significant quantity. In particular, the high surface activity of the calcined alumina leads to hot toner offset wherein some of the toner remains fastened to the fuser member. This results in a substantially diminished fusing latitude, the difference between hot offset temperature and minimum fixed temperature.

We have now surprisingly found that calcined alumina, if used in controlled amounts, will allow enough release latitude and thereby fusing latitude as well as provide improved thermal conductivity and thermomechanical properties to the fuser member since it is a reinforcing filler. Thus by substituting calcined alumina for the iron oxide of the same particle size we have obtained an improved thermal conductivity of the fuser member, improved thermomechanical properties of the fusing member as well as maintaining the appropriate release properties.

SUMMARY OF THE INVENTION

In accordance with the present invention, a thermally conductive fuser member for use in electrostatographic reproducing apparatus is provided.

In particular, the fusing surface of the fusing member comprises a resiliently compressible material which has a good balance between high thermal conductivity, high thermomechanical strength and good release properties. The fusing surface comprises the crosslinked product of a composition comprising 100 parts by weight of alpha omega-hydroxypolydimethylsiloxane, from about 190 to 250 parts by weight alumina, the alumina comprising from about 60 to about 90 percent by weight tabular alumina, and from about 10 to about 40 percent by weight calcined alumina.

In a specific aspect of the present invention the alumina present comprises from about 80 to about 60 percent by weight tabular alumina and from about 20 to about 40 percent by weight calcined alumina.

In a preferred aspect of the present invention the calcined alumina is present in an amount of about 30 percent by weight while the tabular alumina is present in an amount of about 70 percent by weight.

In a further aspect of the present invention the alpha, omega-hydroxypolydimethylsiloxane has a number average molecular weight of from about 5,000 to about 20,000.

In a further aspect of the present invention, the composition is cured and coated onto a fuser member at a thickness of from about 10 to 100 mils.

In a further aspect of the present invention, the tabular alumina is about 325 mesh in size, and the calcined alumina has a particle size less than about 1 micrometer.

DETAILED DESCRIPTION OF THE INVENTION

Figure 1:
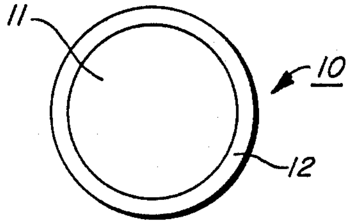
FIG. 1 shows a cross-sectional view of a fuser roll of the present invention.

FIG. 1 shows a fuser roll 10 made with an outer layer of the composition of the present invention. Although the fuser member shown in FIG. 1 is in the form of a roll, it is to be understood that the present invention is applicable to fuser members of other shapes, such as plates or belts. In FIG. 1, the fuser roll 10 is composed of a core 11 having coated thereon a thin layer 12 of the composition of the present invention. The core 11 may be made of various metals such as iron, aluminum, nickel, stainless steel, etc., and various synthetic resins. We prefer to use aluminum as the material for the core 11, although this is not critical. The core 11 is hollow and a heating element (not shown) is generally positioned inside the hollow core to supply the heat for the fusing operation. Heating elements suitable for this purpose are known in the prior art and may comprise a quartz heater made of a quartz envelope having a tungsten resistance heating element disposed internally thereof. The method of providing the necessary heat is not critical to the present invention, and the fusing member can be heated by internal means, external means or a combination of both. All heating means are well known in the art for providing sufficient heat to fuse the toner to the support. The composition of layer 12 will be described in detail below.

Figure 2:
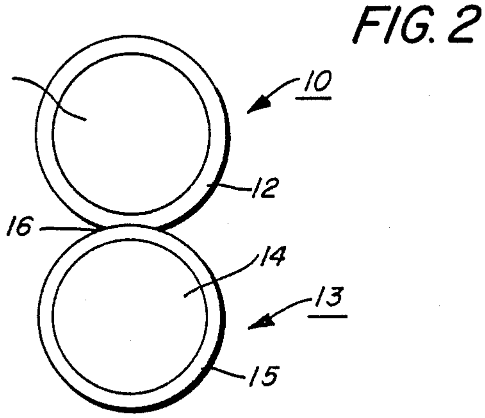
FIG. 2 represents a cross-sectional view of the fuser roll of FIG. 1 as a part of a roll pair, and maintained in pressure contact with a backup or pressure roll.

Referring to FIG. 2, the fuser roll 10 is shown in a pressure contact arrangement with a backup or pressure roll 13. The pressure roll 13 comprises a metal core 14 with a layer 15 of a heat-resistant material. In this assembly, both the fuser roll 10 and the pressure roll 13 are mounted on shafts (not shown) which are biased so that the fuser roll 10 and the pressure roll 13 are pressed against each other under sufficient pressure to form a nip 16. It is in this nip that the fusing or fixing action takes place. It has been found that the quality of the copies produced by the fuser assembly is better when the nip is formed by a relatively hard and unyielding layer 15 with a relatively flexible layer 12. In this manner, the nip is formed by a slight deformation in the layer 12 due to the biasing of fuser roll 10 and the pressure roll 13. The layer 15 may be made of any of the well known materials such as polyfluoroethylenepropylene or silicone rubber.

Figure 3:
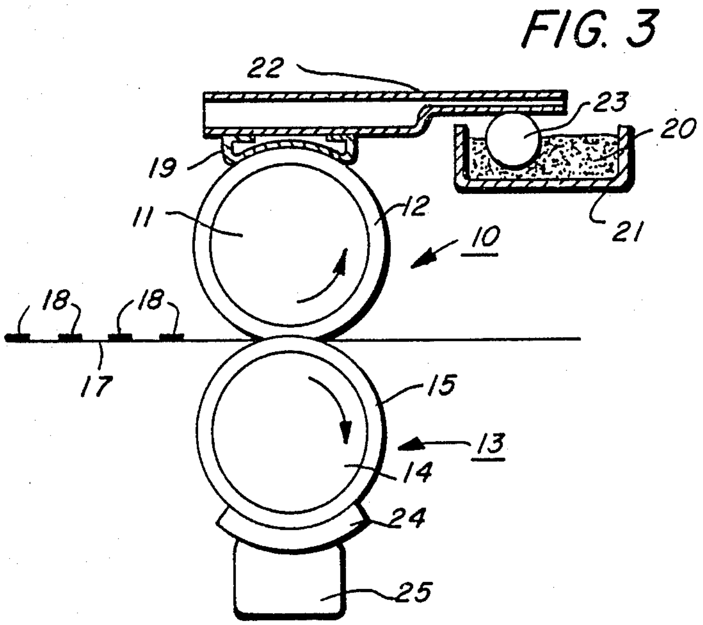
FIG. 3 is a schematic view of a pressure contact fuser assembly which employs the fuser member of the present invention.

FIG. 3 shows a pressure contact heated fuser assembly having a sheet of a support material 17, such as a sheet of paper, bearing thereon toner image 18 passing the fuser roll 10 and pressure roll 13. On fuser roll 10 is mounted an intermediate oil-feeding member 19 from which an offset preventing fluid or release agent 20 is applied to the fuser roll 10. Such release agents are known to the art and may be, for example, a silicone oil. The intermediate oil feeding member 19 also performs the function of cleaning the fuser roll 10. The release agent 20 in sump 21 is fed to the oil feeding member 19 through another intermediate oil feeding member 22 and a feeding roll 23. The pressure roll 13 is in contact with a cleaning member 24 mounted on a supporting member 25.

While the novel fuser member of the present invention has been described with reference to heat fixing or fusing of toner images, it is to be understood that the invention may be also used in cold pressure fixing since the excellent release properties and conformability of the fuser member make it suited for the latter application as well.

In accordance with the present invention, a novel fuser member is provided which is particularly suited for use in the heat fixing of toner images in an electrostatographic copying machine. The coating on the fuser member of the present invention has improved thermal conductivity over prior art devices, has high thermomechanical strength, is flexible and conformable so that it can form a nip with a relatively hard pressure roll, and possesses outstanding release properties and long life. In its broadest aspect, the coating composition comprises;

(a) 100 parts of an alpha omega-hydroxypolydimethylsiloxane having a number average molecular weight of between about 5,000 to about 20,000;

(b) from about 190 part to about 250 parts by weight of alumina comprising from about 60 to about 90 percent by weight tabular alumina and from about 10 to about 40 percent by weight calcined alumina with;

(c) 6 to 9 parts by weight of a crosslinking agent and;

(d) about 0.25 to about 1.8 parts by weight of a crosslinking catalyst.

We have found the alpha omega-hydroxypolydimethylsiloxane to be a particularly suitable material for overcoating a thermally conductive conformable fuser roll. The alpha omega-hydroxypolydimethylsiloxane, which is a disilanol, is believed to have the structural formula:

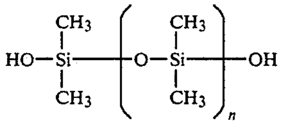

wherein n is an integer whose magnitude depends on the number average molecular weight of the disilanol. For the purpose of the present invention, we prefer to use a disilanol having a number average molecular weight between 5,000 and 20,000. In commercially available materials, this number average molecular weight corresponds roughly to materials having an average viscosity ranging from about 500 centistokes (Cstk) to about 3,500 Cstk. With a disilanol having a number average molecular weight of less than about 5,000, which roughly corresponds to an average viscosity of about less than 500 Cstk, the material is of relatively short chains and therefore contains more active sites at the end of the chains for crosslinking during the curing step. This yields a material which contains too high a crosslinking density, and which is relatively hard and brittle and not suited for the purposes of the present invention.

With the disilanol having a number average molecular weight in excess of about 20,000, which roughly corresponds to an average viscosity of about above 3,500 Cstk, the cured composition does not have sufficient crosslinking density to attain maximum strength and fatigue resistance, and therefore does not have sufficiently long operational life. The siloxane functions as a binder to hold the thermally conducting material providing overall structural integrity and elastomeric conformability. Furthermore, it preferably has a surface tension of from about 20 to 22 dynes per square centimeter to provide adequate release properties and is thermally stable up to a temperature of about 400° F. with good thermal aging at elevated temperatures.

The alumina is incorporated in the composition to both improve the thermal conductivity of the composition as well as provide mechanical strength to the fuser member. An important aspect of the present invention resides in the use of the combination of both tabular alumina and calcined alumina. Both the tabular alumina and calcined alumina have a thermal conductivity of $6\times10^{-2}$ col/cm/sec/C°. This compares very favorably against the $Fe_2O_3$ described in U.S. Pat. No. 4,373,239 which has a thermal conductivity of only $1.4\times10^{-3}$ col/cm/sec/C°, a factor of 40 less conductive than the alumina. As a result the compositions and fusing members of the present invention which in part substitutes calcined alumina for iron oxide exhibit increased thermal conductivity. In addition to providing excellent thermal conductivity, the tabular alumina is employed to provide low surface activity and good release properties to the fuser member. The calcined alumina also provides good thermal conductivity but it also supplies excellent reinforcement of the elastomer by which we mean, it interacts with the polymer forming strong polymer filler interactions. With the total alumina present in the composition of from about 190 to about 250 pounds per 100 parts of polydimethylsiloxane, high thermal conductivity of the fuser member is provided.

Tabular alumina is a sintered alumina that has been heated to a temperature slightly below 3700° F., the fusion point of aluminum oxide. The name "tabular" comes from the fact that the material is composed predominantly of table-like crystals. As previously indicated, the material is characterized by good thermal conductivity and chemical inertness. For the purposes of the present invention the size of the tabular alumina used is important, it being finely divided and not being larger than about 100 mesh in size. At the present time the finest size tabular alumina commercially available is 325 mesh corresponding to a maximum size of about 44 micrometers. We have found this tabular alumina to be very suitable for the purposes of the present invention.

Calcined alumina is alumina heated to a temperature below 3700° F., which prevents fusion from taking place but still allows water to be driven off. What results is a highly surface active filler which in combination with the submicron average particle size of 0.5 $\mu$m yields a very polymer interactive filler. This high interactivity leads to reinforcement of the polydimethylsiloxane polymer via the formation of strong polymer/filler adsorption, which increases the viscosity of the polymer and yields increased strength by so doing.

The total amount of alumina present in the composition can range from about 190 to about 250 parts per 100 parts of polydimethylsiloxane. Over this range of proportions suitable balance between high thermal conductivity, thermomechanical properties and release properties may be maintained. Typically, the tabular alumina is present in an amount from about 60 to 90 percent by weight of the total alumina present in the composition while the calcined alumina is present in an amount from about 10 to about 40 percent by weight of the total alumina present in the composition. We have found that below about 5 percent of the calcined alumina, little reinforcement of the weak rubber is achieved. We have also found that the use of more than 40 percent of the calcined alumina yields a rubber of high modulus and very poor release properties. Preferably the tabular alumina is present in an amount from about 60 to about 80 percent of the total alumina present in the composition and the calcined alumina is present in an amount from about 20 to 40 percent of the total alumina present in the composition as providing a preferred balance between the high thermal conductivity required and the thermomechanical properties and release properties required for the fuser member. Optimum balance between the affected properties is achieved with about 70 percent tabular alumina and 30 percent calcined alumina. Thus the ratio between the tabular and the calcined alumina may be varied to adjust the desired end properties in the fuser member with respect to thermal conductivity, release properties and thermomechanical properties of the fuser member, it being noted that the tabular alumina provides excellent thermal conductivity, low surface activity and thereby contributing to good release properties, while the calcined alumina also provides excellent thermal conductivity, and functions to act as a reinforcing agent for the elastomer thereby contributing to the thermomechanical properties of the fuser member. If the percentage of the calcined alumina exceeds about 40 percent by weight of the total weight of the alumina present in the composition, the fuser member obtained is harder than desired and its conformability with respect to a toner image being fused on a copy sheet is not as good. The particle size of the calcined alumina is important since it must be below about 1 micrometer in average particle size in order to maintain its reinforcing property with the elastomer to form the strong polymer filler interactions. Normally we prefer a particle size of about 0.5 micrometers in insuring adequate reinforcement of the elastomer.

The crosslinking agent used in the composition for coating the fuser member of the present invention is for the purpose of obtaining a material with sufficient crosslink density to attain maximum strength and fatigue resistance. Examples of crosslinking agents which are suitable for the purposes of the present invention include: esters of orthosilicic acid; esters of polysilicic acid; and alkyltrialkoxy silanes. Specific examples of suitable crosslinking agents include: tetramethylorthosilicate; tetraethylorthosilicate; 2-methoxyethylsilicate; tetrahydrofurfurylsilicate; ethylpolysilicate; butylpolysilicate; etc. Alkoxysilanes simultaneously containing hydrogen bound to the silicon atom, such as methyldiethoxysilane or triethoxysilane, are very suitable as polyalkylhydrosilanes. Other suitable crosslinking agents are known to the art. We particularly prefer to use condensed tetraethylorthosilicate as the crosslinking agent in the composition of the invention. The amount of the crosslinking agent employed is not critical, as long as sufficient amount is used to completely crosslink the active end groups on the disilanol polymers used. In this respect, the amount of crosslinking agent required depends on the number average molecular weight of the disilanol polymer employed. With the higher average molecular weight polymer, there are fewer active end groups present and thus a lesser amount of the crosslinking agent is required, and vice versa. When excess amounts of a crosslinking agent are used, the excess is easily removed from the cured composition. Generally, for the preferred disilanol polymer of a number average molecular weight of between about 5,000 to 20,000, we have found that between about 6 to 9 parts by weight of condensed tetraethylorthosilicate per 100 parts by weight of the disilanol polymer to be suitable. Within this range, we prefer to use about 6.6 to 8 parts by weight condensed tetraethylorthosilicate per 100 parts by weight of the disilanol polymer. Of course, if other crosslinking agents are used, the amount to be used should be adjusted stoichiometrically to provide a sufficient amount of the crosslinking agent for the reactive end groups in the disilanol polymer.

Finally, with respect to the crosslinking catalyst used in the composition of the present invention, such catalysts are well known in the art and they include: the amines and carboxylic salts of many metals, such as lead, zinc, zirconium, antimony, iron, cadmium, tin, barium, calcium, and manganese; particularly the naphthenates, octoates, hexoates, laurates and acetates. Examples of suitable catalysts include: stannous octoate; dibutyltin dilaurate; dibutyltin diacetate; and dibutyltin dicaproate. Bis(dibutylchlorotin) oxide and similar compounds can also be used. Other suitale catalysts are disclosed in U.S. Pat. No. 3,664,997. The amount of the catalyst employed is not critical. However, too small an amount of catalyst used leads to a very slow reaction which is impractical. On the other hand, excessive amounts of catalyst may cause a breakdown of the crosslinked polymer network at high temperatures, to yield a less crosslinked and weaker material, thus adversely affecting the thermomechanical strength of the cured material. In general, we have found that between about 0.25 to 1.8 parts by weight of catalyst per 100 parts of the disilanol polymer to be preferred. More particularly, we prefer to use between 0.25 to 0.75 parts by weight of catalyst per 100 parts of the polymer. The specific catalysts preferred are dibutyltin dilaurate and bis(dibutylchlorotin) oxide.

EXAMPLES

The invention will now be described with reference to the following specific examples. In particular, Examples 1 and 4–10 are Examples in accordance with the present invention. Examples 2 and 3 are according to prior art presented for comparative purposes to illustrate the suitability of the present invention compared to other techniques. Unless otherwise indicated all parts and percentages are by weight.

The polydimethylsiloxane or mixtures thereof were as indicated in Table I. Rhodorsil 48V3500 and 48V750 are both alpha omega-dihydroxypolydimethylsiloxanes available from Rhone-Paulenc Company, Monmouth Junction, New Jersey differing in viscosity and molecular weight. The Rhodorsil 48V3500 has a viscosity of about 3500 centipoises while the Rhodorsil 48V750 has a viscosity of about 750 centipoise.

In each example the tabular alumina was Alcoa T61-325 and the calcined alumina was obtained from KC (Kansas City) Abrasives. The iron oxide used in Example 2 was Mapico Red 297, a 0.5 $\mu$m particle size filler. In Examples 2 through 7 fillers and disilanol(s) were added to a Baker-Perkins Model AN2 mixer which was equipped with thermostatically controlled electrical heaters. Mixing times at room temperature were two hours in Example 3, two and one-half hours in Example 2, and three and one-half hours in Examples 4 through 7.

In an attempt to obtain improved dispersion of the 0.5 $\mu$m calcined alumina, equipment such as a Dispersator or ball mill were used. In Example 1, mixing all of the 0.5 $\mu$m calcined alumina and all the 48V3500 polymer was done in a Premier dispersator for three and one-half hours at room temperature prior to mixing in the Baker-Perkins mixer. Thus in Example 1, after dispersator mixing, that polymer/calcined alumina mixture was added to additional polymer (48V750) and tabular alumina in the Baker-Perkins mixer where mixing took place at room temperature for two and one-half hours. In Examples 8, 9, and 10 a ball milling technique was used to obtain good dispersion of all the 0.5 μm calcined alumina in all the disilanol polymers. The disilanols, calcined alumina and the metal or ceramic balls 0.5 to 1.0 inches in diameter were loaded into a ball mill jar and allowed to rotate for the prescribed times. In Example 8, the balls were 0.5 inch steel and the milling time was 24 hours at room temperature. In Examples 9 and 10, the balls were 0.5 to 1.0 inch ceramic and the milling time was 72 hours at room temperature. Again after ball milling, the calcined alumina and disilanol mixture was combined with the tabular alumina in the Baker-Perkins mixer. This was true for all three ball milled examples. The time in the Baker-Perkins mixer was two and three-quarter hours at room temperature. In all examples, after dispersing the fillers into the disilanol polymers in the Baker-Perkins mixer, the condensed tetraethylorthosilicate crosslinker was added and allowed to mix into the filler and polymer compound for one hour at room temperature.

In order to make cured rubber pads for testing physical properties, the compounds were degassed under a vacuum of 2 torr before and after handmixing the dibutyltindilaurate catalyst. After the catalyst addition the materials were formed into pads about 6 inches square and were allowed to cure at the times and temperatures shown. Tables I and II tabulate the materials together with the amounts used as well as the cure time and temperature together with a listing of physical properties achieved in mechanical determined for each of the materials.

TABLE I

| | Examples | | | | | | | | | |
|---|---|---|---|---|---|---|---|---|---|---|
| | 1 | 2 | 3 | 4 | 5 | 6 | 7 | 8 | 9 | 10 |
| Compound Ingredients | | | | | | | | | | |
| Alpha-omega-dihydroxy-polydimethylsiloxane | | | | | | | | | | |
| Rhodorsil 48V350 | 70 | 70 | 100 | 100 | 100 | 100 | 100 | 70 | 70 | 70 |
| Rhodorsil 48V750 | 30 | 30 | — | — | — | — | — | 50 | 30 | 30 |
| Tabular Alumina (Alcoa T61-325) | 177.1 (70) | 214 | 253 | 222.7 (90) | 202.4 (80) | 177.1 (70) | 151.8 (60) | 189.3 (83) | 149.8 (70) | 132.5 (70) |
| 0.5 μm Calcined Alumina (K.C. Abrasives) | 75.9 (30) | — | — | 25.3 (10) | 50.6 (20) | 75.9 (30) | 101.2 (40) | 37.8 (17) | 64.2 (30) | 56.8 (30) |
| 0.4 μm Iron Oxide (Mapico red 297) | — | 25.1 | — | — | — | — | — | — | — | — |
| Condensed Tetraethylorthosilicate | 7.5 | 7.5 | 6.6 | 6.6 | 6.6 | 6.6 | 6.6 | 7.5 | 7.5 | 7.5 |
| Dibutyltindilaurate | 0.5 | 0.5 | 0.75 | 0.75 | 0.75 | 0.25 | 0.5 | .5 | 0.75 | .5 |
| Cure Time/Temperature (hrs./°F.) | 3/158 | 3/158 | 18/140 | 18/140 | 18/140 | 5.5/140 | 6/140 | 3/158 | 3/158 | 3/158 |

TABLE II

| | Examples | | | | | | | | | |
|---|---|---|---|---|---|---|---|---|---|---|
| Physical Properties | 1 | 2 | 3 | 4 | 5 | 6 | 7 | 8 | 9 | 10 |
| Durometer, Shore A | 68 | 71 | 62 | 59 | 60 | 66 | 62 | 62 | 67 | 59 |
| Modulus, $M_{10}$ (psi) | 630 | 720 | 470 | 445 | 430 | 580 | 440 | 530 | 490 | 530 |
| Tensile Strength (psi) | 620 | 620 | 450 | 380 | 485 | 530 | 490 | 610 | 770 | 700 |
| Ultimate Elongation (%) | 80 | 80 | 80 | 80 | 70 | 90 | 90 | 90 | 90 | 100 |
| Trouser Tear (ppi) | 10.0 | 8.2 | 7.9 | 8.9 | 8.3 | 10.2 | 9.4 | 8.1 | 7.5 | 7.0 |
| Specific Gravity | 2.13 | 2.12 | 2.14 | 2.14 | 2.14 | 2.13 | 2.13 | 2.07 | 2.03 | 1.94 |
| Taber Abrader Wear (grams lost after 400 cycles using 500 g load and H-10 wheels) | 0.1095 | 0.1299 | 0.2059 | 0.1218 | 0.1486 | 0.0689 | 0.1124 | 0.1102 | 0.1109 | 0.0469 |

As may be readily observed from the Tables pads made from the compositions according to the present invention are acceptable alternatives to the pads made from other compositions as illustrated in Example 2 (according to U.S. Pat. No. 4,373,239) and Example 3 (all tabular alumina). Based on this test data together with a high thermal conductivity of the all alumina filler compositions, these compositions will be useful as fuser members in electrostatographic reproducing machines. The compositions according to the present invention provide excellent balance between thermal conductivity, thermomechanical properties and toner release properties. In the test data indicated the tear strength, wear resistance and modulus are of particular value. Essentially the tear strength is the ability to resist the formation of cracks in the elastomeric surface. This is a measure of the amount of energy it will take to make a crack grow. It is a measure of fatigue in the sense that it is a measure of the resistance to the growth of cracks in the elastomer. Wear resistance is important because of the required capability of the fusing surfaces to be able to be used with papers of different sizes thereby defining one area (the smallest paper size) as being used more frequently than another. Thus for our purposes this can be interpreted to be the resistance to paper edge wear at the paper path and non-paper path interface. The modulus relates to the resistance to imposed stress. How much, for example, the pad or the fuser member will deform given a certain pressure. In this regard it should be noted that conformability around toner particles prior to fusing is desired in order to provide satisfactory fusing. Fusing with a hard material, for example, which does not conform around the toner particle gives a mottled, glossy image which is to be avoided. With a conformable fusing surface of a softer material the glossy image is not achieved. With respect to the test data it should be noted that in comparing Example 1 with Example 2, for example, that the lower modulus of 630 compared to 720 for Example 2 indicates that the material according to the invention is softer and therefore less force will be required to obtain an equivalent nip and thus less strain energy is imparted to the material per cycle and hence the fatigue cycle should be improved. With regard to tear strength basically the higher the number the more acceptable the tear strength. With regard to wear resistance, the lower the number the better the wear resistance. A comparison of Example 3 with all tabular alumina with the other Examples according to the invention clearly shows its deficiencies with regard to wear resistance. This is because the tabular alumina does not effectively interact with the polymer. Surprisingly we have found the mechanical properties appear to be optimum at around 30 percent of the calcined alumina by weight of the total alumina present in the composition and that they are particularly superior where the amount of alumina present in the total composition approaches the upper limit of 250 parts alumina per 100 parts of polydimethylsiloxane. In this connection comparison of the results achieved in Examples 1, and 6 with those of comparative Examples 2 and 3 clearly demonstrates superiority of this stated range of proportions of calcined alumina and tabular alumina relative to the total amount of alumina present in the composition. Thus by substituting the calcined alumina for the ferric oxide of U.S. Pat. No. 4,373,239 the thermal conductivity is maximized while the strength and release and conformability properties of the materials are maintained. In other words the use of both tabular alumina and calcined alumina increases the thermal conductivity over the tabular alumina/iron oxide of U.S. Pat. No. 4,373,239 thereby enabling a reduction in the temperature to which the core of the fuser need be heated which in turn reduces the opportunity for thermal degradation and the power necessary for heating. Furthermore, the preferred pads according to the invention exhibit improved tear strength and abrasion resistance over the pads made with tabular alumina/iron oxide.

All the patents referred to herein are hereby incorporated in reference in their entirety into the instant specification.

While the invention has been described in detail with reference to specific and preferred embodiments, it will be appreciated that various modifications and variations will be apparent to the artisan. Accordingly it is intended to embrace all such modifications and variations as may fall within the spirit and scope of the appended claims.

What is claimed is:

1. A thermally conductive fuser member for use in an electrostatographic reproducing machine comprising a rigid base, a thin deformable layer of a composition coated thereon, said composition comprising the crosslinked product of a mixture of about 100 parts by weight of alpha omega-hydroxypolydimethylsiloxane having a number average molecular weight between about 5,000 to about 20,000, about 190 to 250 parts by weight of alumina, said alumina comprising from about 60 to about 90 percent by weight of finely divided tabular alumina having a particle size less than about 100 mesh in size and from about 10 to about 40 percent by weight of finely divided calcined alumina having a particle size less than about 1 micrometer, a crosslinking agent and a crosslinking catalyst, said crosslinking agent and catalyst being present in amounts sufficient to promote crosslinking of said siloxane.

2. A thermally conductive fuser member according to claim 1, wherein said alumina is present in an amount of about 250 parts per 100 parts of said siloxane, said tabular alumina is present in an amount of from about 60 to about 80 percent by weight of said alumina and said calcined alumina is present in an amount of from about 20 to about 40 percent by weight of said alumina.

3. A thermally conductive fuser member according to claim 2, wherein said tabular alumina is present in an amount of about 70 percent by weight and the calcined alumina is present in an amount of about 30 percent by weight of said alumina.

4. A thermally conductive fuser member according to claim 1, wherein said tabular alumina is about 325 mesh in size.

5. A thermally conductive fuser member of claim 1, wherein said rigid base is a metallic roll and wherein said thin layer is from about 10 to about 100 mils thick.

6. A thermally conductive fuser member according claim 5, wherein said metallic roll is made of aluminum and said thin layer is from about 30 to about 80 mils thick.

7. A thermally conductive fuser member according to claim 6, wherein said thin layer is from about 60 to about 70 mils thick.

8. A thermally conductive fuser member according to claim 1, wherein said crosslinking agent is condensed tetraethylorthosilicate present in an amount from about 6 to about 9 parts by weight, and wherein said crosslinking catalyst is dibutyltin dilaurate or bis(dibutylchlorotin) oxide present in an amount from about 0.25 to 1.8 parts by weight.

* * * * *